(12) United States Patent
Feller et al.

(10) Patent No.: US 9,843,486 B2
(45) Date of Patent: Dec. 12, 2017

(54) SYSTEM AND METHOD FOR SLA VIOLATION MITIGATION VIA MULTI-LEVEL THRESHOLDS

(71) Applicant: Telefonaktiebolaget L M Ericsson (publ), Stockholm (SE)

(72) Inventors: Eugen Feller, San Francisco, CA (US); Julien Forgeat, San Jose, CA (US); Meral Shirazipour, San Jose, CA (US); Ming Xia, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 242 days.

(21) Appl. No.: 14/689,040

(22) Filed: Apr. 16, 2015

(65) Prior Publication Data
US 2016/0308734 A1    Oct. 20, 2016

(51) Int. Cl.
G06F 15/173 (2006.01)
H04L 12/24 (2006.01)
H04L 12/26 (2006.01)

(52) U.S. Cl.
CPC ...... H04L 41/5009 (2013.01); H04L 41/0681 (2013.01); H04L 41/16 (2013.01); *H04L 41/5025* (2013.01); *H04L 41/5035* (2013.01); *H04L 43/0817* (2013.01)

(58) Field of Classification Search
CPC .................................................. H04L 41/5009
USPC .................................. 709/224, 226; 370/230
See application file for complete search history.

(56) References Cited

U.S. PATENT DOCUMENTS

| 7,870,243 | B1* | 1/2011 | Aikens | H04L 67/322 709/224 |
| 2003/0208523 | A1* | 11/2003 | Gopalan | H04L 41/5009 709/201 |
| 2006/0276995 | A1* | 12/2006 | Breitgand | H04L 12/24 702/179 |
| 2008/0037424 | A1* | 2/2008 | Anstey | H04L 43/028 370/230 |
| 2013/0103837 | A1* | 4/2013 | Krueger | G06F 9/5072 709/226 |
| 2013/0132561 | A1 | 5/2013 | Pasala et al. | |
| 2014/0298091 | A1 | 10/2014 | Carlen et al. | |
| 2015/0006974 | A1* | 1/2015 | Uchiumi | G06F 9/445 714/49 |

(Continued)

OTHER PUBLICATIONS

"Amazon Web Services (AWS)—Cloud Computing Services," <http://aws.amazon.com/>, retrieved Dec. 8, 2014, 2 pages.

(Continued)

*Primary Examiner* — David Lazaro
*Assistant Examiner* — Marie Georges Henry
(74) *Attorney, Agent, or Firm* — Nicholson De Vos Webster & Elliott LLP

(57) ABSTRACT

According to one embodiment, a method in a cloud infrastructure for multi-level threshold service level agreement (SLA) violation mitigation. The method includes generating a model for an engineered feature (eF); determining thresholds T1, T2, and a maximum threshold Tε for the eF based on the model; estimating a value of the eF based on metrics; responsive to determining that the value of the eF exceeds Tε, modifying the values of T1 and T2 and modifying the estimation frequency and sending to a cloud orchestrator a message indicating that an SLA violation of type Tε has occurred.

18 Claims, 10 Drawing Sheets

(56) References Cited

U.S. PATENT DOCUMENTS

2016/0162382 A1    6/2016  Devin
2016/0219071 A1    7/2016  Vasseur et al.

OTHER PUBLICATIONS

"Amazon EC2 Service Level Agreement," <http://aws.amazon.com/ec2/sla/>, retrieved Dec. 8, 2014, 7 pages.
"Apache Spark—Lightning-Fast Cluster Computing," <http://spark.apache.org>, retrieved Dec. 8, 2014, 2 pages.
"Apache Storm, distributed and fault-tolerant realtime computation," <http://storm.apache.org>, retrieved Dec. 8, 2014, 1 page.
"Google Compute Engine—Cloud Computing & IaaS—Google Cloud Platform," <https://cloud.google.com/compute/>, retrieved Dec. 8, 2014, 4 pages.
Delimitrou et al., "Quasar: Resource-Efficient and QoS-Aware Cluster Management," Sigarch Comput. Archit. News 42, 1, Feb. 2014, 17 pages.
Novakovit et al., "DeepDive: Transparently Identifying and Managing Performance Interference in Virtualized Environments," USENIX Annual Technical Conference (USENIX ATC' 13), 2013, pp. 219-230.
Jung et al., "Mistral: Dynamically Managing Power, Performance, and Adaptation Cost in Cloud Infrastructures," In Proceedings of the 2010 IEEE 30th International Conference on Distributed Computing Systems (ICDCS '10), IEEE Computer Society, 2010, pp. 62-73.
Nathuji et al., "Q-clouds: Managing Performance Interference Effects for QoS-aware Clouds," In Proceedings of the 5th European conference on Computer systems (EuroSys '10), Apr. 13-16, 2010, pp. 237-250.
Eugen Feller et al., "System and Method for Analytics-Driven SLA Management and Insight Generation in Clouds", U.S. Appl. No. 14/684,331, filed Apr. 10, 2015, pp. 1-29.
"PredictorImportance", <http://www.mathworks.com/help/stats/compactregressionensemble.predictorimportance.html>, retrieved Apr. 16, 2015, 3 pages.
Beloglazov et al., "Adaptive Threshold-Based Approach for Energy-Efficient Consolidation of Virtual Machines in Cloud Data Centers", Proceedings of the 8th International Workshop on Middleware for Grids, Clouds and e-Science, ACM, Nov. 29-Dec. 3, 2010, 6 pages.
"K-means clustering", <http://en.wikipedia.org/wiki/K-means_clustering>, retrieved Apr. 16, 2015, 14 pages.
Leitner et al., "Runtime Prediction of Service Level Agreement Violations for Composite Services", LNCS 6275, 2010, 16 pages.
Shao et al., "A Runtime Model Based Monitoring Approach for Cloud", IEEE 3rd International Conference on Cloud Computing, 2010, pp. 313-320.

\* cited by examiner

SYSTEM AND METHOD FOR SLA VIOLATION MITIGATION VIA MULTI-LEVEL THRESHOLDS

FIELD

Embodiments of the invention relate to the field of networking; and more specifically, to a system and method for service level agreement (SLA) violation mitigation via multi-level thresholds.

BACKGROUND

Over the past years an increasing number of services ranging from simple web applications to advanced distributed analytics frameworks are deployed in large-scale datacenters operated by third-party cloud providers (e.g., Amazon Web Services®, Google Compute Engine®). Cloud providers leverage virtualization technologies such as hypervisors and containers to achieve high resource isolation and increased resource utilization. While increased resource utilization helps to reduce costs for the cloud provider, cloud customers are looking for predictable service performance via performance guarantees. One way to express service performance guarantees is to establish a Service Level Agreement (SLA) between the customer and cloud provider. SLA's can be broadly classified in two categories: coarse-grained and fine-grained.

A coarse-grained SLA can define a service performance guarantee in terms of an uptime percentage. For example, a cloud platform could implement an SLA policy by providing a monthly uptime percentage guarantee of at least 99.95%. Alternatively, SLAs can be expressed in a more fine-grained manner. For instance, performance can be defined on a per application basis, for example all servers running a particular application should have a minimum response time X or communication delay D. This could also be in terms of a deadline thus requiring the service to finish within a given time frame. Fine-grained SLAs are especially attractive for cloud customers as they provide strict performance guarantees.

SUMMARY

According to some embodiments of the invention, a method in a cloud infrastructure of multi-level threshold service level agreement (SLA) violation mitigation is described. The method includes generating a model for an engineered feature (eF), wherein the eF is based on collected metrics; determining a first threshold T1, a second threshold T2, and a maximum threshold Tϵ for the eF based on the generated model of the eF; and estimating at a predetermined frequency a value of the eF based on real-time metrics. The method further includes in response to determining that the value of the eF exceeds Tϵ, adjusting the values of T1 and T2 and modifying the estimation frequency and sending to a cloud orchestrator a message indicating that an SLA violation of type Tϵ has occurred. In response to determining that the value of the eF does not exceed Tϵ, determining whether the value of eF exceeds T1. The method further includes in response to determining that the value of eF exceeds T1, determining whether the change in rate of eF (eF') has been positive. If the change in rate of eF is positive, the method continues with determining whether the value of eF exceeds T2; and in response to determining that the value of eF exceeds T2, determining whether the change in the rate of eF' (eF'') exceeds a value1. If the value of eF'' exceeds the value1, the method continues with triggering a SLA violation warning of type value1. Alternatively in response to determining that the value of eF does not exceed T2, the method continues with determining whether the change in the rate of eF' exceeds a value2; and in response to determining that the value of eF'' exceeds the value2, triggering a SLA violation warning of type value2.

According to some embodiments a non-transitory computer readable storage medium is described. The storage medium have stored thereon a computer program, which when executed by a processor performs the operations of generating a model for an engineered feature (eF), wherein the eF is based on collected metrics; determining a first threshold T1, a second threshold T2, and a maximum threshold Tϵ for the eF based on the generated model of the eF; and estimating at a predetermined frequency a value of the eF based on real-time metrics. The operations further include in response to determining that the value of the eF exceeds Tϵ, adjusting the values of T1 and T2 and modifying the estimation frequency and sending to a cloud orchestrator a message indicating that an SLA violation of type Tϵ has occurred. In response to determining that the value of the eF does not exceed Tϵ, determining whether the value of eF exceeds T1. The operations further include in response to determining that the value of eF exceeds T1, determining whether the change in rate of eF (eF') has been positive. If the change in rate of eF is positive, the operations continues with determining whether the value of eF exceeds T2; and in response to determining that the value of eF exceeds T2, determining whether the change in the rate of eF' (eF'') exceeds a value1. If the value of eF'' exceeds the value1, the operations further includes triggering a SLA violation warning of type value1. Alternatively in response to determining that the value of eF does not exceed T2, the operations includes determining whether the change in the rate of eF' exceeds a value2; and in response to determining that the value of eF'' exceeds the value2, triggering a SLA violation warning of type value2.

Thus, embodiments of the invention include a system and method for analytics-driven service level agreement (SLA) management and insight generation in cloud infrastructure.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
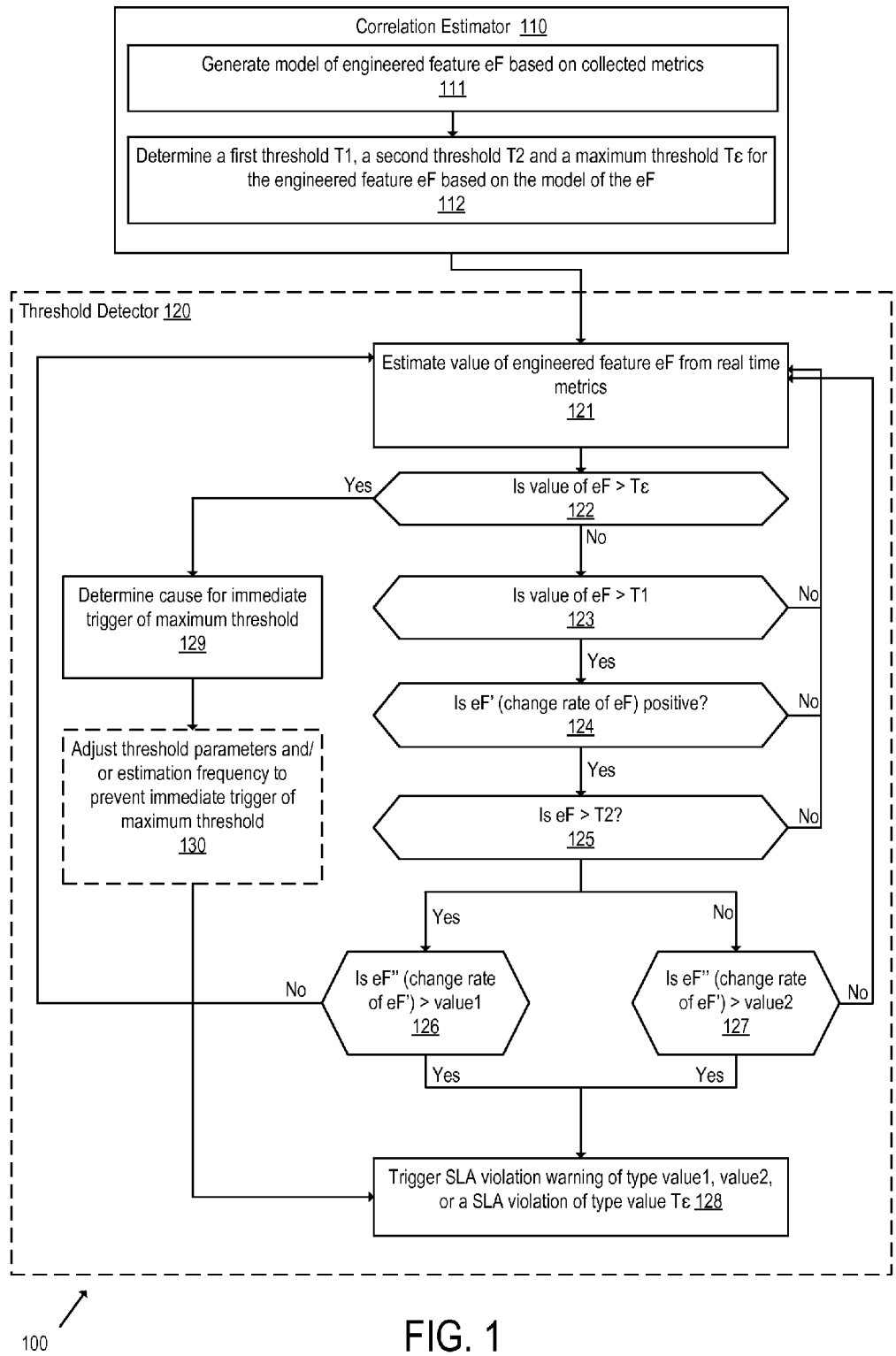
FIG. 1 is a block diagram illustrating a system and method for service level agreement (SLA) violation mitigation via multi-level thresholds according to some embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in some embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

One of a cloud provider's goals may be to optimize the adherence to various SLA definitions and policies made between the customer and the cloud provider. This may additionally be achieved by insight generation, which may constitute an important part of a cloud infrastructure. For instance, predicted service resource demands can be used to optimize the infrastructure by adjusting service resource allocations. As another example, insight detection may also cover anomaly detection that deals with the ability of the system to detect abnormal service behavior (e.g., sudden change in service resource usage behavior).

To better optimize the adherence to SLA definitions and policies, embodiments of the invention provide for methods, systems, and apparatuses for multi-level threshold service level agreement (SLA) violation mitigation. More specifically, embodiments of the invention 1) use a range of thresholds on a monitored engineered feature(s) (eF) in the cloud infrastructure in order to reduce oscillation when detecting between SLA satisfaction and violation in an unstable systems (i.e. gives some time to the infrastructure to self-adjust first); 2) introduce a dynamic self-adjusting mechanism for the thresholds estimation resulting in a more optimized selection of threshold values; 3) use various threshold values on the current and past values of eF to make a decision for the SLA violation and SLA violation warning triggering; and 4) expose the features responsible for SLA violation and SLA violation warning triggering to assist in a better understanding of the cause(s) of the failure and/or the warnings of potential failures. An eF may be a function specified by an SLA definition based on metrics collected in the system. When the eF exceeds certain thresholds, an SLA violation or SLA violation warning may be triggered.

FIG. 1 is a block diagram illustrating a system 100 and method for service level agreement (SLA) violation mitigation via multi-level thresholds. System 100 includes a correlation estimator 110. Correlation estimator 110, at block 111, generates a model of the engineered feature (eF) based on collected metrics. An eF is a function of multiple individual features related to a service executing on the infrastructure of the cloud provider. A service executes one or more workloads/tasks on the infrastructure. Each service may be controlled by a service controller component. The multiple service controllers may in turn be controlled by a cloud orchestrator. These services may include applications such as web servers, database servers, virtual machines, etc. In other words, the services may execute software for software as a service (SaaS), platform as a service (PaaS), and infrastructure as a service (IaaS) cloud services. In some embodiments, the infrastructure represents one or more computing devices and the software (e.g., virtualized software) executing on the computing devices such that multiple services may execute on the computing devices while being isolated from each other. The cloud orchestrator may perform various maintenance and administrative tasks regarding the infrastructure, and other tasks that are centralized in nature.

The individual features in the eF are numerical values that represent parameters related to an object. This object may be an element within the infrastructure of the cloud that an administrator is interested in monitoring. Such objects may include basic elements such as CPU, RAM, network, storage, and more customized elements such as an application executing within the virtualized environment, or the client end stations connected to the virtualized environment. The objects' parameters may be represented numerically using metrics. For example, the CPU may be represented by values such as CPU usage, CPU usage per service or application, CPU temperature, etc. As another example, the network may be represented by network bandwidth used, average network bandwidth, network I/O count, etc.

Moreover, the eF is a function of one or more features and is meant to represent a meaningful measurement of a behavior of interest in the infrastructure of the cloud provider. For example, one eF could be the ratio of received traffic over CPU utilization of a particular service. If this value is sufficiently small, then this might indicate that more processing resources should be allocated to that service or that the service should be further optimized to reduce CPU usage. On the other hand, if this ratio is high, this might indicate that additional workloads may be placed on the hardware executing this service as there are many spare CPU cycles available. Another example of an eF could be the number of packet drops for a service over a period of time (e.g., 1 min).

In some embodiments, the determination of how to design the eF may be made by a domain expert, i.e. someone who has a good understanding of the various objects in the infrastructure and can determine which function of the underlying features might provide a useful measurement of behaviors of interest in the network.

In some embodiments, the model of the eF takes the historically collected numerical values of the features used in the function of the eF and determines a statistical distribution of the features (e.g., the historically collected numerical values of the features may be plotted them in a histogram distribution). This may result in a normal, or Gaussian, distribution of the eF values. Using this model or any other statistical analysis method, one (e.g., a domain expert) may be able to determine the ideal values for the eF and which eF values should be considered to be abnormal for the corresponding service. At block 112, the correlation estimator 110, using this model, determines a first threshold T1, a second threshold T2, and a maximum threshold T$\epsilon$ for the eF. Each threshold, compared to the previous threshold, is a value that is set further towards the maximum threshold. The intermediate thresholds (which are less than the maximum threshold, e.g., T1 and T2) may be referred to as warning thresholds. If a calculated eF exceeds the maximum threshold, then a SLA violation is triggered. In contrast if a calculated eF exceeds a warning threshold, a SLA violation warning (a warning message) is triggered. The SLA violation warning includes an indication that a SLA violation is likely to happen soon. It indicates the potential occurrence of a SLA violation. The values for these thresholds may be determined by a domain expert or by machine learning. Additional details regarding the selection of thresholds will be described herein.

At block 121, the system estimates the value of the eF from current objects' parameters referred to as real time metrics (i.e. real time feature values). As noted, the eF is a function of multiple features, which are numerical values derived from metrics collected from the infrastructure (objects' parameters). Thus, the eF may be calculated mathematically. In some embodiments, block 121 and the subsequent blocks described below are executed by a threshold detector 120.

At block 122, the threshold detector 120 determines if the value of eF is greater than T$\epsilon$. If so, execution proceeds to block 129, where the threshold detector 120 determines the cause for the immediate trigger for the maximum threshold. To do this, in some embodiments, the threshold detector 120 may examine the metrics used to calculate the eF to determine whether a particular metric is in an outlier state, or to determine which metric was the main contributor to the eF exceeding the T$\epsilon$. In some embodiments, the threshold detector 120 may also determine whether the collected metric values are within acceptable ranges. These ranges may be determined based on historical data or may be preconfigured by a domain expert.

After determining the cause for the immediate triggering of the maximum threshold, at block 130 the threshold detector readjusts the threshold parameters and/or the estimation frequency to prevent the immediate trigger of the maximum threshold in block 122. In some embodiments, the readjustment of the threshold parameters and/or the estimation frequency is optional. In these embodiments, the readjustment may be performed only if block 122 returns true too often (i.e., the eF is determined to be above the maximum threshold multiple times). In an alternative embodiments, the readjustment is performed each time an eF is determined to be above the maximum threshold T$\epsilon$. The threshold detector 120 may modify the value of the threshold values based on the determination in block 129. For example, the threshold detector 120 may determine that the metrics used to calculate the eF were within reasonable bounds, and so it may change the value of the thresholds (e.g., higher) so that the SLA violation detected with T$\epsilon$ is not immediately triggered. Alternatively, the threshold detector 120 may have determined that the rate at which the eF reached the T$\epsilon$ value was very fast, and so may also or instead increase the frequency of the estimation at block 121 so that it may detect the changes in the eF value faster. Subsequently, execution proceeds to block 128 where a SLA violation is triggered. In some embodiments, when an SLA violation is triggered, a message is sent to the cloud orchestrator in the infrastructure to notify the cloud orchestrator of the violation and the violation type and to allow the cloud orchestrator to resolve it. In some embodiments, the SLA violation is of type threshold T$\epsilon$.

If the determination at block 122 was answered in the negative, execution proceeds to block 123. At block 123, the threshold detector 120 determines if the calculated eF value is greater than T1. If so, execution proceeds to block 124. Otherwise, execution proceeds back to block 121. Note that T1 is only the first threshold value and so even if it is exceeded, no SLA violation is triggered. At block 124, the threshold detector 120 determines whether the moment of eF is positive. The moment of eF is the first derivative of eF, i.e., the change in eF. This may be determined mathematically, as eF is a function, or it may be determined numerically by calculating the eF value for prior collected metrics. When the change in eF is positive, this may indicate that eF is approaching the next threshold. Execution then proceeds to block 125. If the change in eF is not positive, then this may indicate that eF is not approaching the next threshold, and execution returns to block 121.

At block 125, the threshold detector 120 determines whether eF is greater than T2. T2 is a threshold value that is greater than, or closer towards the maximum threshold value, than T1. If the determination at block 125 is affirmative, then execution proceeds to block 126. Otherwise, execution proceeds to block 127.

At block 126, threshold detector 120 determines whether the value of the second moment of eF (eF'') is greater than a value1. As noted previously, eF'' may be computed mathematically or numerically. The second moment represents the change in the rate of eF, or the "acceleration" of eF, or the change in the change of eF. Since eF has not exceeded T2, it is assumed that the value of eF may still be in a relatively safe region compared to if eF had exceeded T2. Thus, compared to the value2 of block 127, value1 may be set to a higher value to allow for a faster acceleration for the value of eF. If the value of eF'' exceeds value1, then execution proceeds to block 128 where an SLA violation warning is triggered. The SLA violation warning may be marked to indicate that the detected violation is of type value1. Otherwise, execution returns to block 121. In some embodiments, in addition to the violation warning and the type of violation (e.g., value1), a message including elements of the eF that caused the violation may be sent to the cloud orchestrator.

At block 127, threshold detector 120 determines whether the value of the second moment of eF (eF'') is greater than a value2. As the value of eF has already exceeded T2, it is in a more dangerous zone where it might soon exceed the maximum threshold. Thus, value2 may be set to a relatively smaller value compared to value1. If the value of eF'' exceeds value2, then execution proceeds to block 128 where an SLA violation warning is triggered. The SLA violation warning may be marked to indicate that the detected violation is of type value2. In some embodiments, in addition to the violation warning and the type of violation (e.g., value2), a message including elements of the eF that caused the violation may be sent to the cloud orchestrator. Otherwise, execution returns to block 121. Both value1 and value2 may be determined based on historical data using machine learning or by a domain expert. Additional embodiments for determining the threshold values shown above will be described in further detail herein.

Although three thresholds and two values are shown in FIG. 1, in alternative embodiments the number of intermediate thresholds and values may be different. Using the method described above, the system 100 is able to use a range of thresholds to determine whether an SLA violation has occurred or is about to occur. For example, in some embodiments the threshold T$\epsilon$ may be used to detect that a SLA violation has occurred. In contrast, the thresholds T1, T2, and the values value1, and value2 (which may also be referred to as "warning thresholds" and "warning values" respectively) may be used to detect that a SLA violation is about to occur. In these embodiments, the warning thresholds and warning values are used to trigger warning message(s) (or "SLA violation warning(s)") to send to the cloud orchestrator. This may help to reduce oscillation when detecting SLA violations and allows time for the infrastructure to self-adjust first before an actual violation occurs.

Figure 2:
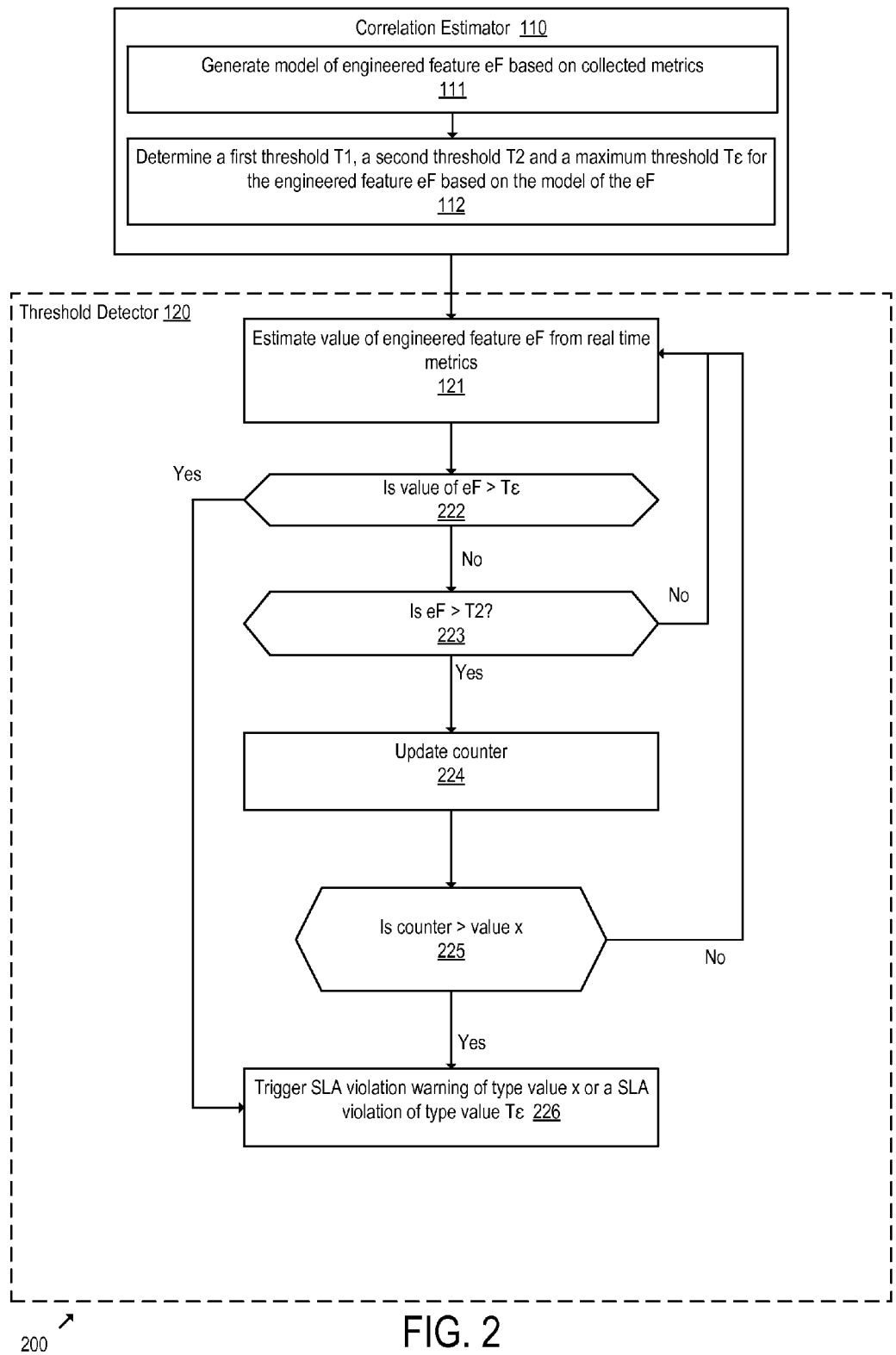
FIG. 2 is a block diagram illustrating a system and method for service level agreement (SLA) violation mitigation via multi-level thresholds according to some embodiments of the invention.

FIG. 2 is a block diagram illustrating a system 200 and method for service level agreement (SLA) violation mitigation via multi-level thresholds. While FIG. 1 illustrated a threshold detector 120 concerned with a single instance of a possible violation, FIG. 2 illustrates a method that also keeps count of a number of times that an intermediate threshold is exceeded.

As shown previously, the correlation estimator 110 generates a model of the eF at block 110 and determines one or more threshold values and a maximum threshold value T$\epsilon$ at block 112. At block 121, the threshold detector 120 also estimates the value of the eF from the real time metrics received from the infrastructure.

At block 222, the threshold detector 222 determines whether the value of the estimated eF is greater than the T$\epsilon$. If so, execution proceeds to block 226 where an SLA violation is triggered. The SLA violation is of type T$\epsilon$. The way in which the violation is triggered is similar to that described above. Otherwise, execution proceeds to block 223. At block 223, the threshold detector 120 determines whether the estimated eF is greater than T2. If so, execution proceeds to block 224. Otherwise execution proceeds back to block 121. In some embodiments, the threshold detector may determine at block 223 if the estimated eF is greater than another threshold (e.g., T3) different from T2. The threshold T3 is less than T$\epsilon$ and similarly to T2 allows the detection of a state in which a violation is likely to occur and enables the warning of the cloud orchestrator that the violation is likely to occur.

At block 224, the threshold detector updates a counter value (e.g., increase the counter value by 1 or a value relative to how much eF exceeded T2 in block 223). At block 225, if the counter value exceeds a value x, then execution proceeds to block 226 where a violation warning is triggered. The triggered violation warning may be marked to indicate that it is a violation warning of type value x (e.g., a counter-triggered SLA violation warning). Additionally, the counter may be reset to a default value (e.g., "0"). In some embodiments, the counter is reset after a violation warning is triggered. Otherwise, execution returns to block 121. The value x may be determined using historical data through a domain expert or machine learning. It may be set to a value for the service related to the eF which may help to indicate when that service is encountering issues.

Using this method, the system 200 may also be able to trigger a violation warning when an intermediate threshold is exceeded too many times in a given time frame. While the maximum threshold may not be exceeded in this case, exceeding the intermediate threshold multiple times may also indicate that there are issues with the associated service. In this embodiment the counter may be reset after a violation warning is triggered (at block 226) and/or after the given time frame has elapsed.

Note that although the operator of greater than is used with reference to the descriptions of the threshold detector 120 in FIGS. 1 and 2, in other embodiments different operators such as less than is used. In some embodiments, a combination of the techniques described with respect to FIGS. 1 and 2 may be used to trigger SLA violation warnings. In some of these embodiments, a first threshold, a second threshold and a maximum threshold may be used along with a counter associated with one of these thresholds to detect and trigger SLA violation warnings. In alternative embodiments, a different number of thresholds may be used.

Figure 3:
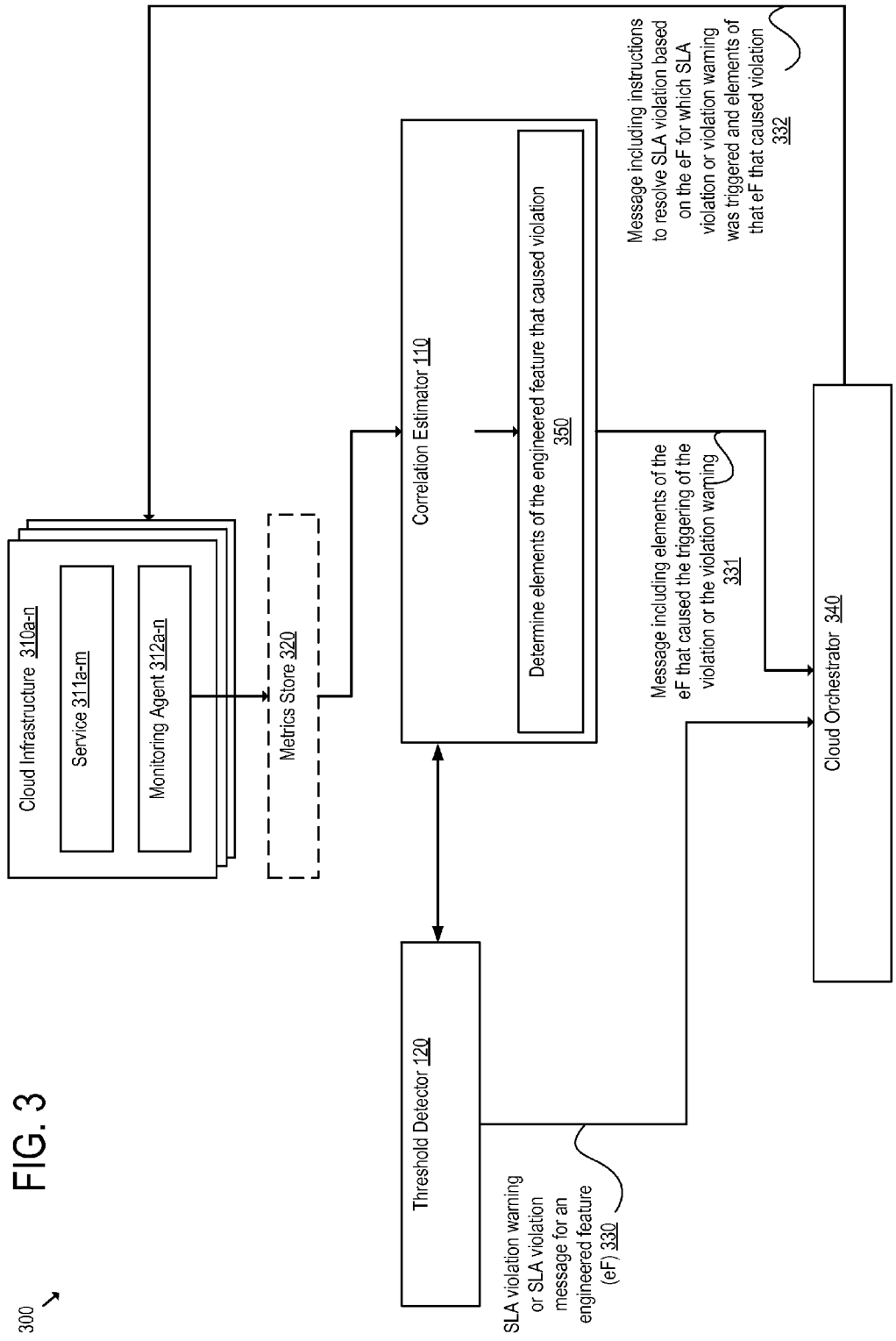
FIG. 3 is block diagram illustrating the correlation estimator 110 and the threshold detector 120 within a system 300 according to some embodiments of the invention.

FIG. 3 is block diagram illustrating the correlation estimator 110 and the threshold detector 120 within a system 300 according to some embodiments of the invention. The correlation estimator 110 and the threshold detector 120 may be part of a larger system 300. This system 300 includes cloud infrastructure 310a-n. In one embodiment, the cloud infrastructure 310 may represent one or more computing devices, on which one or more virtual machines (or hypervisors) execute. Services 311a-m, which execute workloads, are then distributed among these virtual machines. These services may include web applications, database servers, and other software that a client of the cloud provider has requested to be executed on the cloud provider's infrastructure. The cloud infrastructure may also have executing on them one or more monitoring agents 312. These agents are able to collect metrics (e.g., CPU usage, etc.) from the cloud infrastructure and pass this information to the correlation estimator 110 and the threshold detector 120. Additionally, the system 300 may also include a metrics store 320. The metrics store 320 stores historical metrics that have been collected over time and may be used by the correlation estimator 110 to generate the models of the various engineered features, to determine the threshold values, and to determine the eF' and eF" values, etc.

The correlation estimator 110 additionally may, at block 350, determine the elements of the engineered feature that most likely caused or contributed to a SLA violation and/or SLA violation warning that is triggered. This may be determined by selecting those input metrics that have the highest rate of change for an eF or may be determined using a root cause analysis method. Additional details regarding this determination will be described later with reference to FIG. 8.

When the threshold detector 120 sends a message 330 to the cloud orchestrator 340 indicating that a SLA violation has occurred or that a possible SLA violation has been detected (i.e., a SLA violation warning is triggered) for a particular eF, the correlation estimator 110 may then send a message 331 to the cloud orchestrator 340 indicating those elements that it has determined most likely caused or contributed to the SLA violation or to the SLA violation warning. This may then allow the cloud orchestrator 340 to then resolve the SLA violation by sending a message 332 to the infrastructure 310 specifically targeting those elements that most likely caused or contributed to the SLA violation or to the SLA violation warning being triggered, instead of just a generic or standard response to that type of SLA violation/warning. When targeting those specific elements, the cloud orchestrator 340 may instruct the cloud infrastructure 310 to address specific parameters related to those elements. For example, if RAM allocation was a specific element that caused the SLA violation for a service, then the cloud orchestrator 340 may instruct the infrastructure 310 to specifically allocate more RAM from the spare pool to the service.

In this way, not only can the system address the SLA violation and/or the SLA violation warning, but it can address them more efficiently by pinpointing the specific element(s) that contributed significantly or most likely caused them.

Figure 4:
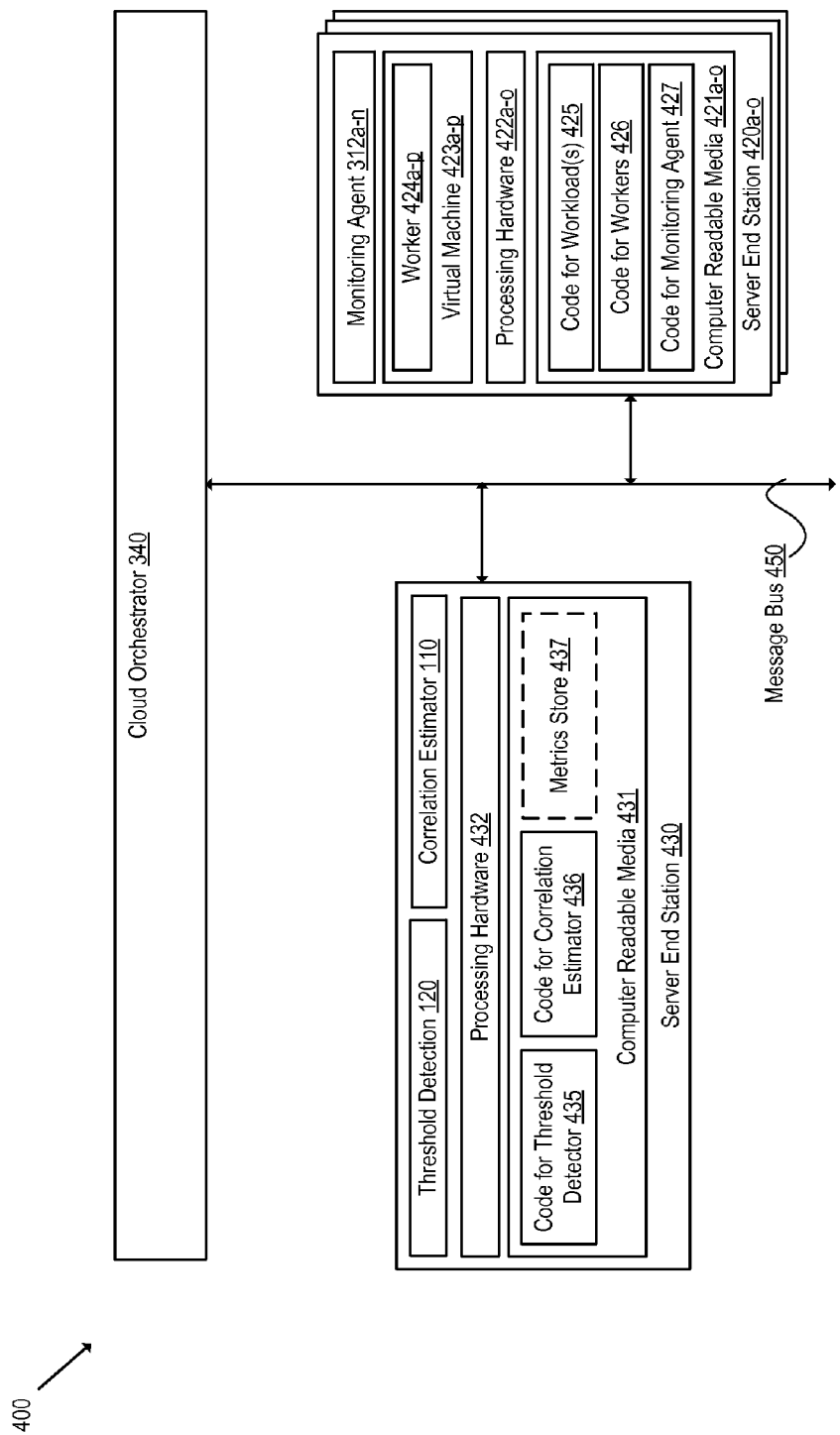
FIG. 4 is detailed block diagram illustrating an exemplary hardware implementation of the elements in system 300 according to some embodiments of the invention.

FIG. 4 is a detailed block diagram illustrating an exemplary hardware implementation of the elements in system 300 according to some embodiments of the invention. The cloud orchestrator 340 is a combination of hardware (e.g., a computing device) and software (cloud orchestration software). It is communicatively coupled via a message bus 450 to a server end station 430. Server end station 430 includes code 435 for the threshold detector and code 436 for the correlation estimator on computer readable media 431. The computer readable media 431 may additionally store the metrics store 320. Using the processing hardware 432, the server end station 430 executes the threshold detector 120 and the correlation estimator 110 as described herein based on the code 435 for the threshold detector and the code 436 for the correlation estimator.

The message bus 450 is also communicatively coupled to one or more server end stations 420a-o that each may include a monitoring agent 312, a worker 424 executing on a virtual machine 423, processing hardware 422, and computer readable media 421 with code 425 for the workloads executed by the worker, code 426 for the workers themselves, and code 427 for the monitoring agent.

Each worker may execute one or more tasks related to a service. Each service may have one or more workloads, and these workloads are distributed among these workers. An example of a workload is a daemon for a database. Another example of a workload is a task to count the number of words in a file.

Figure 5:
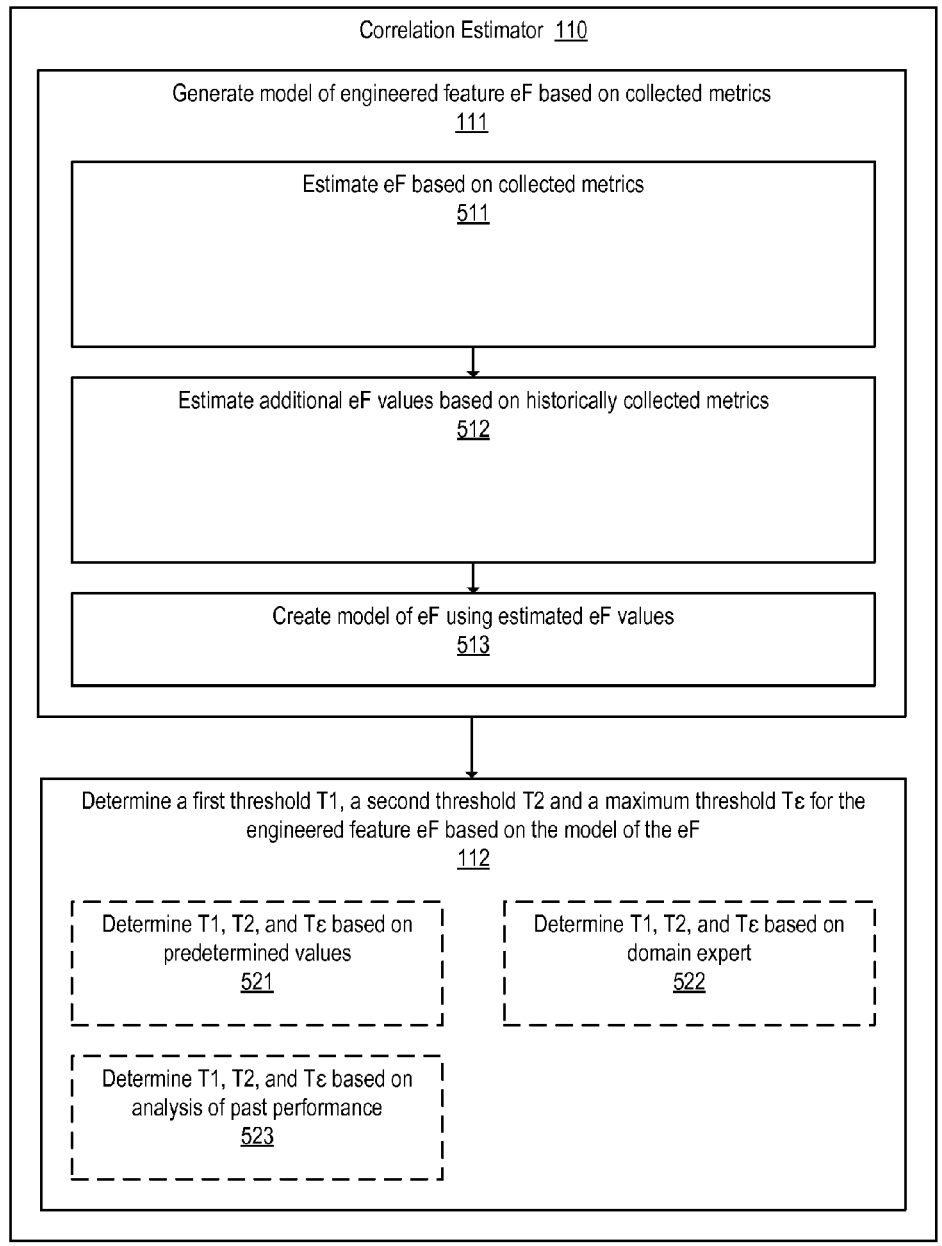
FIG. 5 is detailed block diagram illustrating the correlation estimator 110 according to some embodiments of the invention.

FIG. 5 is detailed block diagram illustrating the correlation estimator 110 according to some embodiments of the invention. As noted previously, at block 111, the correlation estimator 110 generates a model of the eF based on collected metrics. To do this, in some embodiments, at block 511, the correlation estimator 110 estimates the eF according to the function definition based on collected metrics. At block 512, the correlation estimator 110 further estimates additional eF values based on historically collected metrics. From these estimated eF values, at block 513 the correlation estimator 110 creates a model of the eF. This may be done by plotting the estimated eF values in a distribution. In some cases this distribution may be a normal distribution. As some values of the eF are more likely to occur historically, the normal distribution would be centered around those values.

After generating the model of the eF, the correlation estimator 110 determines one or more threshold values (e.g., T1, T2, value1, value2) and a maximum threshold value T$\epsilon$ at block 112. To do this, in some embodiments, the threshold values are determined based on predetermined values at block 521. For example, for a normal distribution, these predetermined values may be set to a certain number of standard deviations from the mean. In some embodiments, at block 522, the determination is made based on a domain expert. As noted previously, a domain expert is a person knowledgeable in the field in question. Such a domain expert may have good knowledge of the underlying service and the technologies used by the service and may be able to set a maximum threshold at which the service would perform unacceptably and additional intermediate thresholds which serve as warning thresholds. In some embodiments, at block 523, the determination is made using an analysis of past performance. The correlation estimator 110 may look at past SLA violations, warnings and past metrics to determine at which point a desired behavior or performance dropped significantly, or where a system failure occurred, or where customer or end user complaints were received, etc., and use these factors to determine the best values to set the thresholds to. These thresholds are then used by the threshold detector 120 to determine whether an SLA violation and/or a SLA violation warning (the violation warning is an indication that a SLA violation is likely to occur soon and is triggered by an intermediate threshold (a warning threshold)) should be triggered during real time monitoring of the infrastructure.

Figure 6:
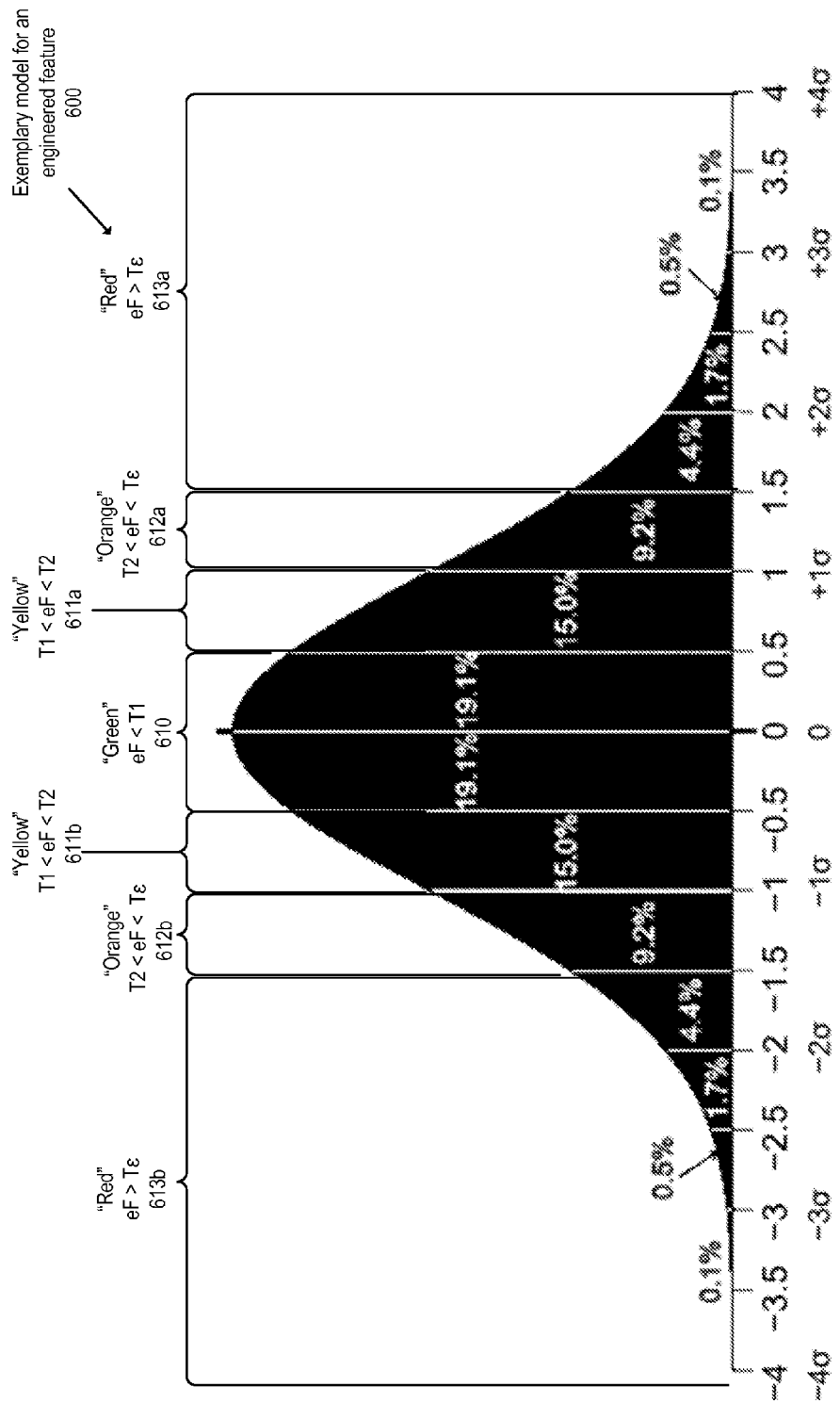
FIG. 6 is an exemplary model 600 for an engineered feature with threshold values according to some embodiments of the invention.

FIG. 6 is an exemplary model 600 for an engineered feature with threshold values according to some embodiments of the invention. As shown in FIG. 6, the model 600 is a normal distribution. The eF may be any combination of features capable of being expressed in a numerical value. Using the method illustrated in FIG. 5, the eF is estimated based on historical metrics and these values are distributed in the model. Those most frequently occurring eF values are near the mean, and those eF values further from the mean value occur less frequently. A currently estimated eF value that is in the range of values that occur less frequently may indicate that the associated service or infrastructure is in an abnormal state or that an SLA violation has occurred or is soon to occur.

One way of determining how far away a value is from a normal or average state is to see how many standard deviations that value is from the mean value. In some embodiments, the correlation estimator 110 determines the one or more threshold values (e.g., T1, T2, T$\epsilon$) based on the standard deviations in the normal distribution model of an eF. Thus, an eF value within a single standard deviation may be in a relatively safe "green" zone as indicated by the bracketed range 610. Exceeding the first standard deviation range means that the T1 threshold is exceeded. An eF value between one and one and a half standard deviations may be within a "yellow" zone indicated by the bracket range 611. Exceeding this "yellow" zone means that the T2 threshold is exceeded. Thus, the yellow zone is between T1 and T2. The area between one and a half and two standard deviations may then be a more critical "orange" zone as indicated by the bracketed range 612. Exceeding this orange zone means that the maximum threshold T$\epsilon$ is exceeded. Any values exceeding this maximum threshold is within a "red" zone as indicated by the bracket range 613. If the eF value is estimated to be in this area, then an SLA violation should be triggered.

When using the method described above to set the threshold values, the correlation estimator 110 would need to have sufficient prior data in order to first generate the model of the eF in order to know where the standard deviations are. This may require that the system run for a while in order to collect the metrics. After the model is generated and the thresholds determined, the correlation estimator 110 may continuously update the model using newly received metrics and update the threshold values accordingly. Furthermore, the thresholds may further be adjusted according to the methods described herein. For example, if the block 225 in FIG. 2 is frequently answered in the affirmative using a certain T2 threshold value, then the T2 threshold value may be adjusted.

Figure 7:
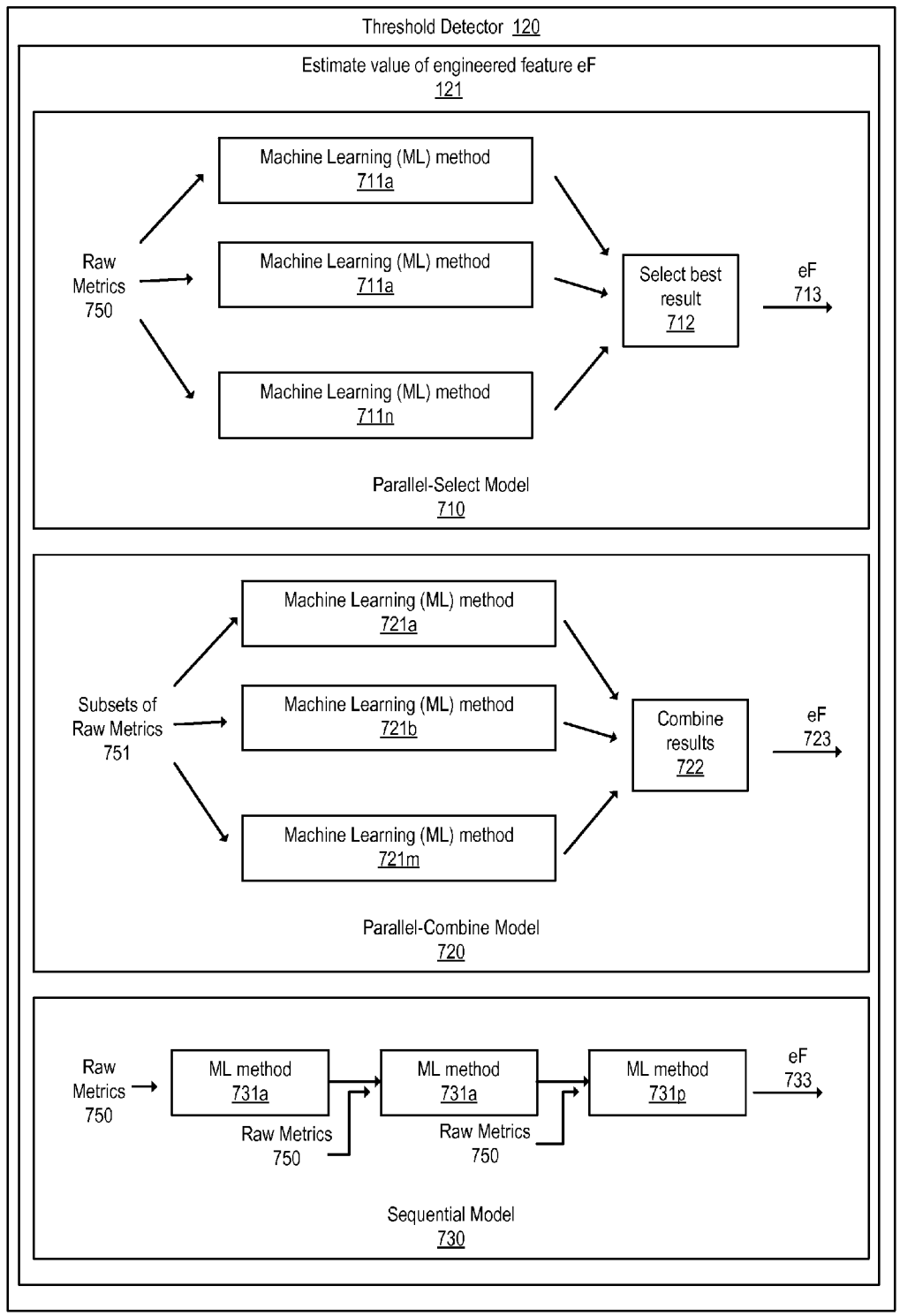
FIG. 7 is a block diagram illustrating methods of estimating the eF value according to some embodiments of the invention.

FIG. 7 is a block diagram illustrating methods of estimating the eF value according to some embodiments of the invention. As shown previously, the correlation estimator 110 estimates the eF value both to determine whether a threshold has been exceeded and also to generate a model of the eF. In some embodiments, the eF is computed using a mathematical function (e.g., Rx traffic/CPU utilization). However in other embodiments the eF is computed using various machine learning methods. Machine learning is a process that applies various mathematical and logic concepts to recognize patterns in data sets. For example, an artificial neural network is a type of machine learning method. The artificial neural network includes a collection of states, accepts one or more inputs, traverses one or more internal (hidden) states, and produces one or more outputs. The artificial neural network is traversed via an internal path that has the best score (according to weights on the paths). Furthermore, if given a set of training data, the artificial neural network may undergo a learning process whereby its parameters (e.g., weights) are adjusted so that it can better approximate the training data results. Other examples of machine learning methods include vector machines, decision trees, Bayesian networks, and so on.

Such machine learning methods may be able to model more complicated features and provide better information about the associated service than a simple mathematical formula. Furthermore, these machine learning (ML) methods may be combined together to yield even more useful information. For example, the ML methods may be combined in a parallel select method 710. The raw metrics 750 are fed to one or more ML methods 711, and at block 712 the best result out of the various ML methods is selected. The best result may be one that minimizes some error, or is most optimal according to a cost equation, or has a highest correlation, or satisfies some other criteria. This best result is then selected as the eF 713.

As another example as illustrated in FIG. 7, a parallel-combine method 720 may be used. A subset of the raw metrics 751 is fed to one or more ML methods 721 and the results are combined at block 722. The combination operation may be yet another ML method, or may be a mathematical function. This function may, for example, weight the various results from the ML methods together to produce a weighted average. The result from block 722 is selected as the eF 723.

As a last example as illustrated in FIG. 7, the raw metrics 750 are fed into a first ML method 731a, and then the results of that are combined with additional raw metrics 750 and fed into a second ML method 731b. This may be repeated until a ML method 731p, after which the result is selected as the eF 733. This sequential method may allow each ML method to iteratively optimize on the previous result. Thus, each ML method may be the same or similar to the previous one.

In some embodiments, some of the ML method blocks shown above may be simpler functions such as a linear regression instead of an actual complicated machine learning method.

Figure 8:
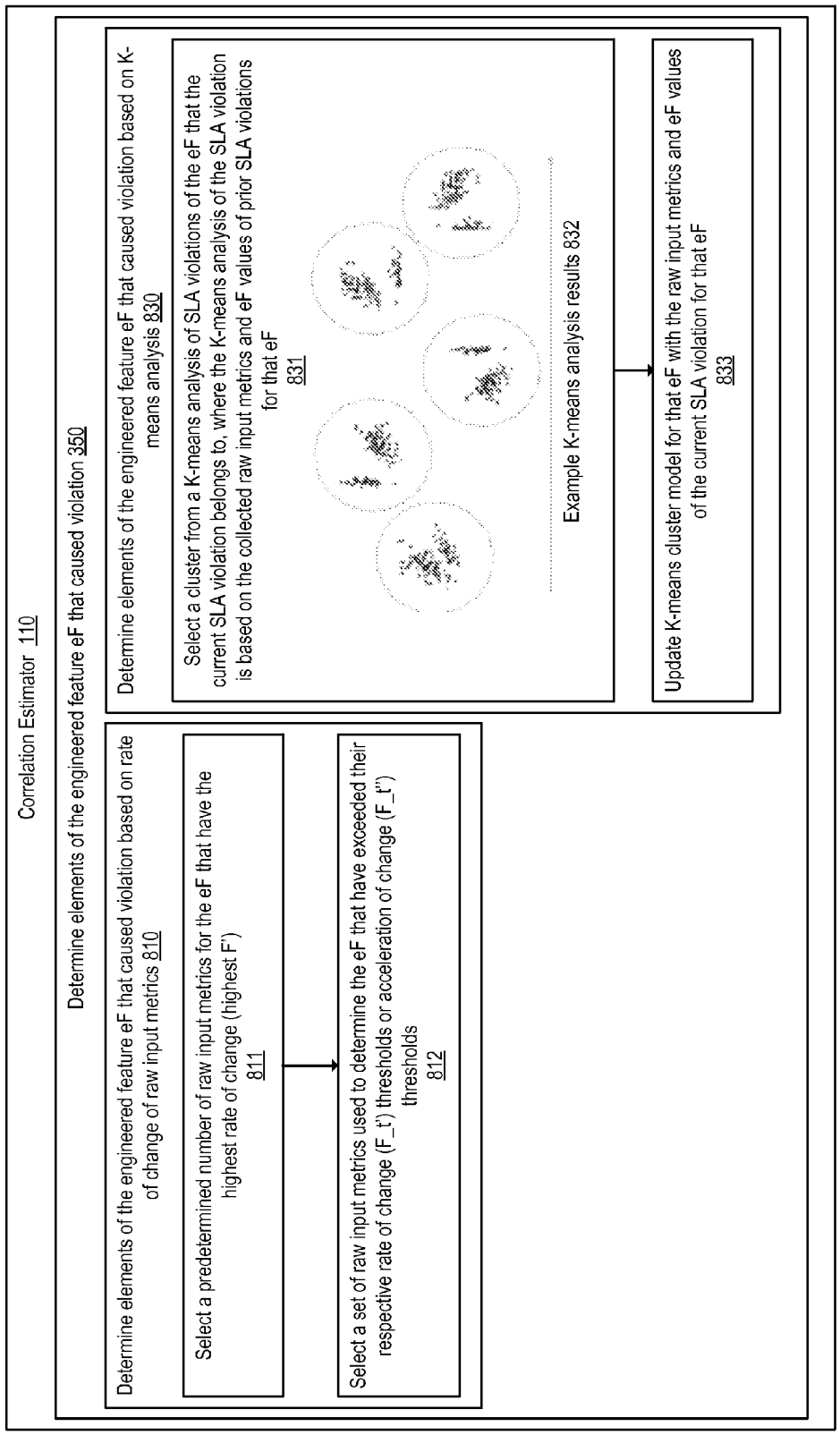
FIG. 8 is a block diagram illustrating the determination operation at block 350 in the correlation estimator 110 according to some embodiments of the invention.

FIG. 8 is a block diagram illustrating the determination operation at block 350 in the correlation estimator 110 according to some embodiments of the invention. At block 350, the correlation estimator 110 determines the elements of the eF that caused the SLA violation and/or the SLA violation warning to be triggered. These elements, as shown previously, may be sent to the cloud orchestrator along with the SLA violation message and/or SLA violation warning sent by the threshold detector 120.

At least two different methods may be used to determine these elements. At block 810, the elements are determined based on the rate of change of raw input metrics. To do this, at block 811 the correlation estimator 110 selects a predetermined number of raw input metrics for the eF in question that have the highest change (i.e., highest first moment or first derivative). These elements are selected to be sent to the cloud orchestrator. At block 812, a further set of elements are selected. These are the raw input metrics that were used to determine the eF that have exceeded a threshold value. These threshold values are either a threshold value for the first derivative (change), or a threshold value for the second derivative (change of the change). By exceeding certain threshold values, these raw input metrics may be very far from a normal value, and so they may have contributed to the SLA violation and/or SLA violation warning being triggered. The threshold values may be determined using analysis of past performance in a similar fashion to how the thresholds for the eF are determined as shown above.

A second method of determining these elements uses k-means analysis. K-means analysis is used to determine if a pattern exists among the variables used to compute the results of a function. It samples the values for these variables and plots them in a graph having dimensions equal to the number of variables for that function. The samples that are taken are based on the situation that one wishes to analyze. For example, if one wishes to analyze the factors involved in a failure condition, then the samples that are taken should be those that were involved in the failure condition. The plot may then reveal that certain variables are clustered together, which may indicate a strong correlation between that variable and the situation that is being analyzed, e.g., a failure condition. This variable may then be further analyzed to determine if it might have caused the situation.

Thus, at block 830, the correlation estimator 110 performs a k-means analysis of the raw metrics used for the SLA violation as they were during the SLA violation. Some of these metrics may have contributed in that case to the SLA violation. The plotted metrics may then cluster around specific areas which may indicate a correlation between specific values for certain metrics and the SLA violation. The metrics in these clusters may then be submitted to the cloud orchestrator, upon which the cloud orchestrator may automatically, or with the assistance of a domain expert, determine if these metrics and their underlying objects may need adjustment. At block 833, the k-means model for that SLA violation is updated with the values of the metrics that were present during this most recent SLA violation.

Figure 9:
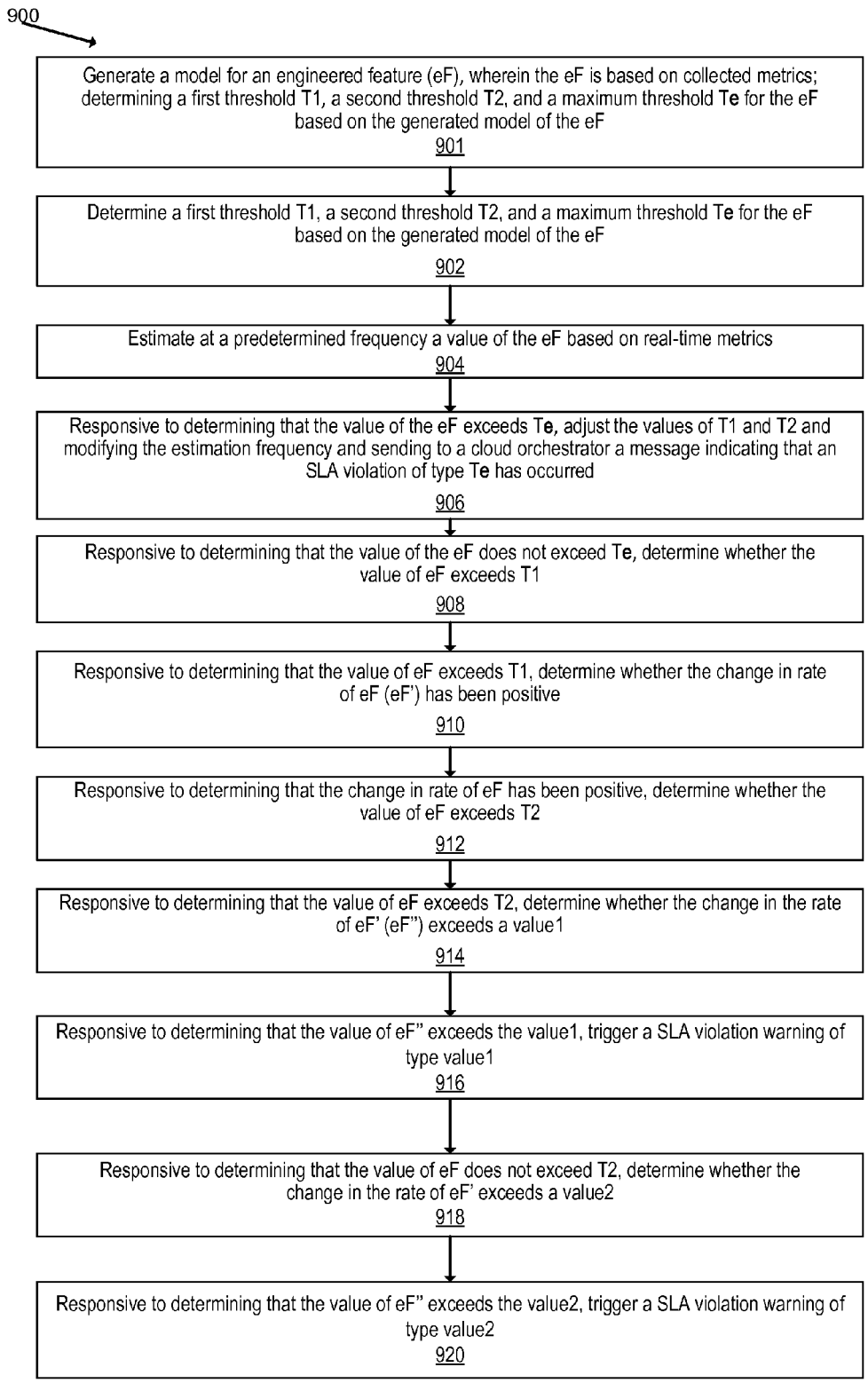
FIG. 9 is a flow diagram illustrating a method 900 according to an embodiment of the invention for a system and method for service level agreement (SLA) violation mitigation via multi-level thresholds according to some embodiments of the invention.

FIG. 9 is a flow diagram illustrating a method 900 according to an embodiment of the invention for a system and method for service level agreement (SLA) violation mitigation via multi-level thresholds. The operations in flow diagram 900 may be performed by the server end station 430. At block 901, the server end station generates a model for an engineered feature (eF), wherein the eF is based on collected metrics. At block 912, the server end station determines a first threshold T1, a second threshold T2, and a maximum threshold Tϵ for the eF based on the generated model of the eF. At block 904, the server end station estimates at a predetermined frequency a value of the eF based on real-time metrics. At block 906, the server end station, responsive to determining that the value of the eF exceeds Tϵ, adjusts the values of T1 and T2 and modifies the estimation frequency and sends to a cloud orchestrator a message indicating that an SLA violation of type Tϵ has occurred. At block 908, the server end station, responsive to determining that the value of the eF does not exceed Tϵ, determines whether the value of eF exceeds T1.

At block 910, the server end station, responsive to determining that the value of eF exceeds T1, determines whether the change in rate of eF (eF') has been positive. At block 912, the server end station, responsive to determining that the change in rate of eF has been positive, determines whether the value of eF exceeds T2. At block 914, the server end station, responsive to determining that the value of eF exceeds T2, determines whether the change in the rate of eF' (eF") exceeds a value1. At block 916, the server end station, responsive to determining that the value of eF" exceeds the value1, triggers a SLA violation warning of type value1. At block 918, the server end station responsive to determining that the value of eF does not exceed T2, determines whether the change in the rate of eF' exceeds a value2. At block 920, the server end station, responsive to determining that the value of eF'" exceeds the value2, triggers a SLA violation warning of type value2. In some embodiments, the triggering of a SLA violation warning of type value1 or type value2 (at block 916 and block 920 respectively) includes the transmission of a warning message indicating that a SLA violation is likely to occur soon in the system.

In some embodiments, the server end station further determines one or more elements of the eF that triggered the SLA violation warning and sends to the cloud orchestrator a message indicating the one or more elements.

In some embodiments, when making the determination that the one or more elements of the eF that triggered the SLA violation warning, the server end station also selects a predetermined number of raw input metrics for the eF that have the highest rate of change and selects a set of raw input metrics used to determine the eF that have exceeded their respective rate of change or rate of rate of change thresholds.

In some embodiments, when making the determination that the one or more elements of the eF that triggered the SLA violation warning, the server end station also selects a cluster from a K-means analysis of SLA violation warnings of the eF that the SLA violation warning belongs to, where the K-means analysis of the SLA violation warning is based on the collected raw input metrics and eF values of prior SLA violation warnings for that eF.

In some embodiments, when making the estimation of the value of the eF, the server end station also determines the value of eF using one of a parallel select machine learning model, a parallel-combine machine learning model, and a sequential machine learning model.

In some embodiments, when generating the model of the eF, the server end station also estimates the one or more eF values based on historically collected metrics and creates a model based on the one or more eF values.

In some embodiments, when making the determination of the threshold values, the server end station determines the T1, T2, and the Tϵ based on at least one of a set of predetermined values, a domain expert, and analysis of past performance.

In some embodiments, the server end station, responsive to determining that the value of eF exceeds T2, updates a counter value and responsive to determining that the counter value exceeds a value x, triggers a SLA violation warning of type value x and resets the counter value.

Figure 10:
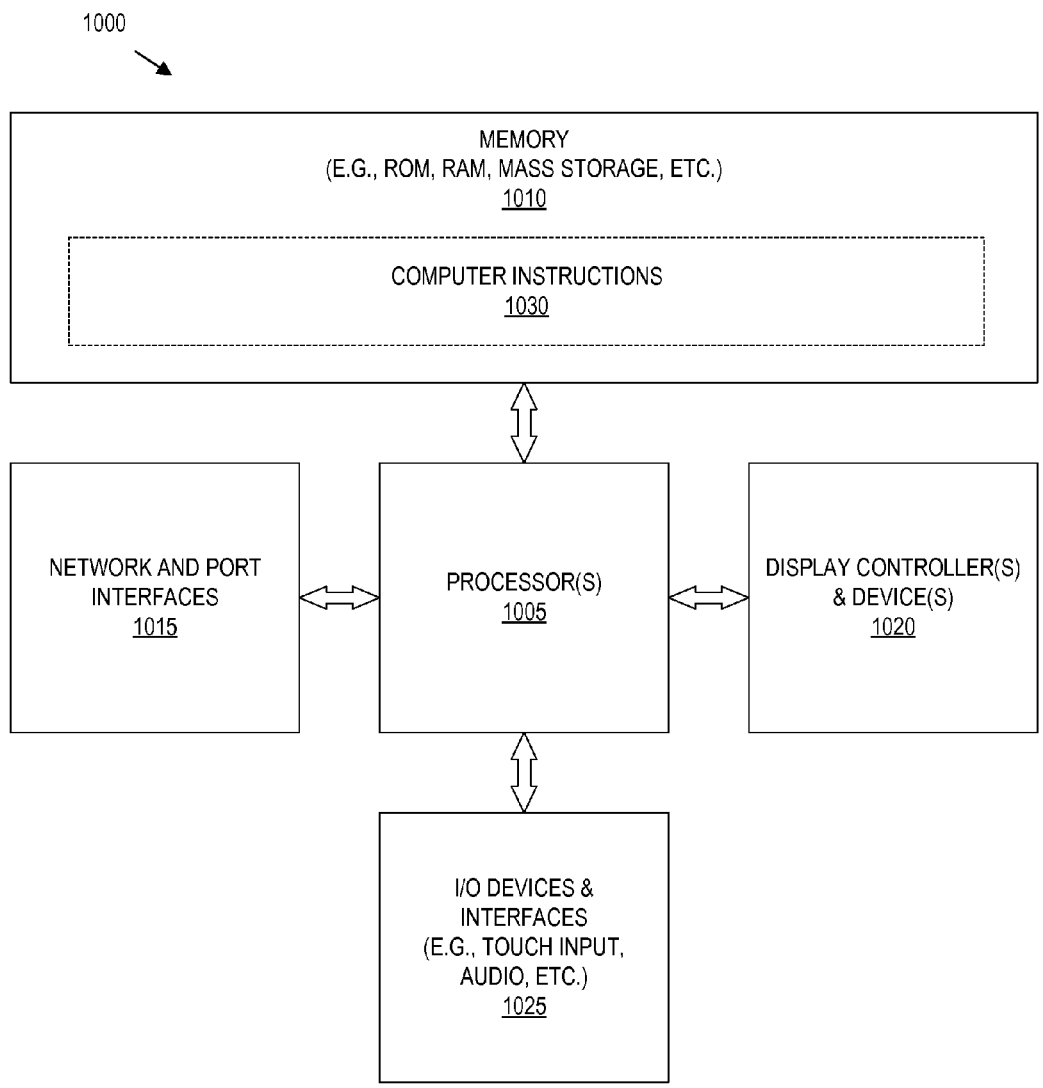
FIG. 10 illustrates a block diagram for an exemplary data processing system 1000 that may be used in some embodiments of the invention.

FIG. 10 illustrates a block diagram for an exemplary data processing system 1000 that may be used in some embodiments. Data processing system 1000 includes one or more microprocessors 1005 and connected system components (e.g., multiple connected chips). Alternatively, the data processing system 1000 is a system on a chip. One or more such data processing systems 1000 may be utilized to implement the functionality of the modules, server end stations, hosts, or other devices as illustrated above in FIGS. 1-9.

The data processing system 1000 includes memory 1010, which is coupled to the microprocessor(s) 1005. The memory 1010 may be used for storing data, metadata, and programs for execution by the microprocessor(s) 1005. For example, the depicted memory 1010 may store computer instructions 1030 that, when executed by the microprocessor(s) 1005, causes the data processing system 1000 to perform the operations described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1010 may be internal or distributed memory. In some embodiments, a portion or all of the computer instructions 1030 are stored on an external cloud device.

The data processing system 1000 may also include a display controller and display device 1020 that provides a visual user interface for the user, e.g., GUI elements or windows. The display device 1020 may also display various media content to the user. The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000. The I/O devices and interfaces 1025 may also include a connector for a dock or a connector for a USB interface, FireWire, Thunderbolt, Ethernet, etc., to connect the system 1000 with another device, external component, or a network. Exemplary I/O devices and interfaces 1025 also include wireless transceivers, such as an IEEE 1002.11 transceiver, an infrared transceiver, a Bluetooth transceiver, a wireless cellular telephony transceiver (e.g., 2G, 3G, 4G), or another wireless protocol to connect the data processing system 1000 with another device, external component, or a network and receive stored instructions, data, tokens, etc. In some embodiments, these various components will be provided as a system on a chip (SoC). It will be appreciated that one or more buses may be used to interconnect the various components shown in FIG. 10.

For example, the data processing system 1000 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1000 may be a network computer, server, network device, router, or an embedded processing device within another device or consumer electronic product. As used herein, the terms computer, system, device, processing device, and "apparatus comprising a processing device" may be used interchangeably with the term data processing system 1000 and include the above-listed exemplary embodiments.

It will be appreciated that additional components, not shown, may also be part of the system 1000, and, in some embodiments, fewer components than that shown in FIG. 10 may also be used in a data processing system 1000. For example, in some embodiments where the data processing system 1000 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network and/or port interface 1015. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

An electronic device, such as the media devices, portable client devices, server computing devices, and/or content servers described herein, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by some embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a cloud infrastructure of multi-level threshold service level agreement (SLA) violation mitigation, the method comprising:

generating a model for an engineered feature (eF), wherein the eF is based on collected metrics;

determining a first threshold T1, a second threshold T2, and a maximum threshold Tϵ for the eF based on the generated model of the eF, wherein the maximum threshold Tϵ when exceeded indicates that a SLA violation occurred, and wherein the first threshold T1 and the second threshold T2 are intermediate thresholds that are smaller than the maximum threshold Tϵ;

estimating at a predetermined frequency a value of the eF based on real-time metrics;

responsive to determining that the value of the eF exceeds Tϵ, adjusting the values of T1 and T2 and modifying the predetermined frequency and sending to a cloud orchestrator a message indicating that an SLA violation of type Tϵ has occurred;

responsive to determining that the value of the eF does not exceed Tϵ, determining whether the value of eF exceeds T1;

responsive to determining that the value of eF exceeds T1, determining whether a change in rate of eF (eF') has been positive;

responsive to determining that the change in rate of eF has been positive, determining whether the value of eF exceeds T2;

responsive to determining that the value of eF exceeds T2, determining whether a change in the rate of eF' (eF") exceeds a value1;

responsive to determining that the value of eF" exceeds the value1, triggering a SLA violation warning of type value1;

responsive to determining that the value of eF does not exceed T2, determining whether the change in the rate of eF" exceeds a value2;

responsive to determining that the value of eF" exceeds the value2, triggering a SLA violation warning of type value2;

determining one or more elements of the eF that triggered the SLA violation warning; and sending to the cloud orchestrator a message indicating the one or more elements.

2. The method of claim 1, wherein the triggering of a SLA violation warning includes sending to the cloud orchestrator a message indicating that a SLA violation is likely to occur soon.

3. The method of claim 2, wherein the message further includes the type of the SLA violation warning, and wherein the type of the violation warning is one of the type of value1 and the type of value2.

4. The method of claim 1, wherein the determining the one or more elements of the eF that triggered the SLA violation warning further comprises:

selecting a predetermined number of raw input metrics for the eF that have the highest rate of change; and selecting a set of raw input metrics used to determine the eF that have exceeded their respective rate of change or rate of rate of change thresholds.

5. The method of claim 1, wherein the determining the one or more elements of the eF that triggered the SLA violation warning further comprises:

selecting a cluster from a K-means analysis of SLA violation warnings of the eF that the SLA violation warning belongs to, where the K-means analysis of the SLA violation warning is based on collected raw input metrics and eF values of prior SLA violation warnings for that eF.

6. The method of claim 1, wherein the estimating the value of the eF comprises determining the value of eF using one of a parallel select machine learning model, a parallel-combine machine learning model, and a sequential machine learning model.

7. The method of claim 1, wherein the generating the model of the eF comprises:

estimating one or more eF values based on historically collected metrics; and creating a model based on the one or more eF values.

8. The method of claim 1, wherein the determining the T1, T2, and the Tϵ further comprise:

determining the T1, T2, and the Tϵ based on at least one of a set of predetermined values, a domain expert, and analysis of past performance.

9. The method of claim 1, further comprising:

responsive to determining that the value of eF exceeds T2, updating a counter value; and responsive to determining that the counter value exceeds a value x, triggering a SLA violation warning of type value x and resetting the counter value.

10. A non-transitory computer readable medium, having stored thereon a computer program, which when executed by a processor performs the following operations:

generating a model for an engineered feature (eF), wherein the eF is based on collected metrics;

determining a first threshold T1, a second threshold T2, and a maximum threshold Tϵ for the eF based on the generated model of the eF, wherein the maximum threshold Tϵ if exceeded by a value of the eF indicates that a SLA violation occurred, and wherein the first threshold T1 and the second threshold T2 are intermediate thresholds that are smaller than the maximum threshold Tϵ;

estimating at a predetermined frequency a value of the eF based on real-time metrics;

responsive to determining that the value of the eF exceeds Tϵ, adjusting the values of T1 and T2 and modifying the predetermined frequency and sending to a cloud orchestrator a message indicating that an SLA violation of type Tϵ has occurred;

responsive to determining that the value of the eF does not exceed Tϵ, determining whether the value of eF exceeds T1;

responsive to determining that the value of eF exceeds T1, determining whether a change in rate of eF (eF') has been positive;

responsive to determining that the change in rate of eF has been positive, determining whether the value of eF exceeds T2;

responsive to determining that the value of eF exceeds T2, determining whether a change in the rate of eF' (eF") exceeds a value1;

responsive to determining that the value of eF" exceeds the value1, triggering a SLA violation warning of type value1;

responsive to determining that the value of eF does not exceed T2, determining whether the change in the rate of eF" exceeds a value2;

responsive to determining that the value of eF" exceeds the value2, triggering a SLA violation warning of type value2;

determining one or more elements of the eF that triggered the SLA violation warning; and sending to the cloud orchestrator a message indicating the one or more elements.

11. The non-transitory computer readable medium claim 10, wherein the triggering of a SLA violation warning includes sending to the cloud orchestrator a message indicating that a SLA violation is likely to occur soon.

12. The non-transitory computer readable medium of claim 10, wherein the message further includes the type of the SLA violation warning, and wherein the type of the violation warning is one of the type of value1 and the type of value2.

13. The non-transitory computer readable medium of claim 10, wherein the determining the one or more elements of the eF that triggered the SLA violation warning further comprises:
selecting a predetermined number of raw input metrics for the eF that have the highest rate of change; and
selecting a set of raw input metrics used to determine the eF that have exceeded their respective rate of change or rate of rate of change thresholds.

14. The non-transitory computer readable medium of claim 10, wherein the determining the one or more elements of the eF that triggered the SLA violation warning further comprises:
selecting a cluster from a K-means analysis of SLA violations warnings of the eF that the SLA violation warning belongs to, where the K-means analysis of the SLA violation warning is based on collected raw input metrics and eF values of prior SLA violation warnings for that eF.

15. The non-transitory computer readable medium of claim 10, wherein the estimating the value of the eF comprises determining the value of eF using one of a parallel select machine learning model, a parallel-combine machine learning model, and a sequential machine learning model.

16. The non-transitory computer readable medium of claim 10, wherein the generating the model of the eF comprises:
estimating one or more eF values based on historically collected metrics; and
creating a model based on the one or more eF values.

17. The non-transitory computer readable medium of claim 10, wherein the determining the T1, T2, and the T$\epsilon$ further comprise:
determining the T1, T2, and the T$\epsilon$ based on at least one of a set of predetermined values, a domain expert, and analysis of past performance.

18. The non-transitory computer readable medium of claim 10, wherein the operations further comprise:
responsive to determining that the value of eF exceeds T2, updating a counter value; and
responsive to determining that the counter value exceeds a value x, triggering a SLA violation warning of type value x and resetting the counter value.

* * * * *